Patented June 25, 1946

2,402,864

UNITED STATES PATENT OFFICE 2,402,864

PAINT

Paul Zurcher, Ponca City, Okla., assignor to Continental Oil Company, Ponca City, Okla., a corporation of Delaware No Drawing. Application April 30, 1943,
Serial No. 485,167

2 Claims. (Cl. 106—256)

My invention relates broadly to paints and more particularly to paints charactezired by their resistance to high temperatures and to weathering.

The paint embodying this invention is particularly adapted to protect metal equipment exposed to high temperatures under conditions promoting rusting and deterioration of the metal. Examples of such equipment are metal stacks, boiler doors, etc. Ordinary paints will not withstand the high temperatures to which equipment of this nature is subjected.

Paint compositions are known which contain pigments that sinter at elevated temperatures and thus protect the metal surface to which they are applied by the formation of a hard, air-tight film. However, these paints are defective in several respects. The pigments comprise finely ground vitreous compounds such as silicates, borates, borosilicates, etc. To make the heat resistant compounds, the ingredients are treated at high temperatures until they have reacted with each other and form a molten vitreous mass. After cooling this hard glass-like mass must be pulverized into an impalpable powder before it can be incorporated into a paint composition. This is a very difficult and expensive operation. The peculiar shape of the ground particles and their gravity cause them to settle rapidly when mixed with a vehicle. It is necessary to continuously stir a paint containing a pigment of the above character while it is being applied. This is not surprising when it is considered that the specific gravity of lead metaborate, one of the compounds used in such compositions, is approximately 5.6. A further undesirable characteristic of these paints is that they are porous after the organic material has been burned off. This is apparently caused by the difficulty with which the pigment particles are distributed evenly on the surface. Another undesirable characteristic is that these paints are difficult to apply and if spray equipment is used it is quickly deteriorated by the abrasive action of the presintered pigment materials.

An important object of my invention is to provide a paint which will adequately protect the surfaces of metals subjected to high temperatures.

Another object of my invention is to provide a paint that can be easily and evenly applied to the surface being painted.

Still another object of my invention is to provide a paint that is particularly suitable for stacks, oven doors and the like and which will not become porous upon sinteiing.

Yet another object of my invention is to provide a paint that can be easily applied either by a brush or by spraying apparatus.

Still another object of my invention is to provide a paint of the above mentioned character wherein the pigments will not settle out even after long periods of storage.

A further object of my invention is to provide a paint of the above mentioned character that is unaffected by weathering between the time of application and the heating.

My paint composition comprises an ordinary paint vehicle, boric acid, and one or more pigments that will react with boric acid at high temperatures forming a practically water-insoluble borate. The vehicle may be any of those generally used in paint compositions such as linseed oil; tung oil; oiticica oil, perilla oil, asphalts such as gilsonite, grahamite, petroleum asphalts, and coal tars, or mixtures thereof; or solutions of natural or synthetic resins either mixed with the above oils or with a suitable thinner such as turpentine, naphtha, toluol or xylol. The pigment may be any metal or metal compound that will react with boric acid when heated. Lead or zinc compounds are preferred. Examples are red lead, lead oxide, basic carbonate of lead, blue lead, lead hydrate, zinc oxide or zinc carbonate, zinc hydrate or zinc dust. The metal or metal compound and the boric acid is added in sufficient amount and proportion so that they combine to form a solid, impervious film of metal borate. The amount of boric acid to be added in the compound depends upon the nature and amount of the borate forming metal or metal compound, upon the character of the composition as a whole and upon the nature and amount of the non-borate forming constituents. Obviously, the composition should contain no constituents that will rupture the film of borate or adversely affect the formation of the film. Under the influence of heat such a paint composition forms a tightly adherent heat and weather resisting film of lead borate, zinc borate, etc. A solid, coherent coating is formed which resists the influence of heat and weathering after all the organic matter originally in the paint has been completely burned away.

It should be noted that the above described paint composition becomes discolored or of different shades as the reaction proceeds and the organic matter is gradually disintegrated by the high temperatures. Different pigments produce different types and degrees of discoloration. The discoloration is caused by uneven application of heat to the painted surface. In actual practice there are very few instances where heat is applied uniformly to the surface. Consequently, different temperatures exist at different portions of the surface and the progress of the reaction is uneven. As a result, the surface presents an uneven and unsightly appearance. Therefore, where appearance is important, I incorporate into the paint one or more pigments such as red iron oxide or manganese dioxide. Any pigment can be used that is not affected by heat and which hides discoloration. By adding these pigments alone or in suitable combinations I am able to produce a number of different colors including a superior black. When these compounds are also added the painted surface is uniformly colored at all times even though it is unevenly heated.

The following examples illustrate the invention.

*Example 1*

This paint had the following composition:

| Vehicle 56%: | Per cent |
|---|---|
| Resin | 10 |
| Vegetable oil | 40 |
| Drier and volatile | 50 |
| Pigment 44%: | |
| Blue lead | 90 |
| Zinc chromate | 10 |

The blue lead pigment contained approximately 37 per cent lead oxide as well as varying amounts of lead sulfate, zinc oxide, and carbon black. Sufficient boric acid ($H_3BO_3 \cdot H_2O$) in powder form was added to combine with 77 per cent of the lead oxide. Upon application of heat the boric acid and lead oxide react to form a vitreous film of lead borate ($PbB_4O_7$). The boric acid was easily incorporated into the paint without appreciably affecting its consistency. The brushing qualities of the paint were excellent, probably due to the presence of the minute flaky particles of boric acid. The pigment did not settle during storage.

A panel coated with a sample of the paint to which no boric acid had been added was heated in an electric furnace simultaneously with a similar panel coated with a sample of the paint to which boric acid had been added. The following results were observed at progressively higher furnace temperatures.

| | A. Paint containing no boric acid | B. Paint containing boric acid |
|---|---|---|
| 410° F | Discoloration began | No discoloration. |
| 490° F | Brown | Do. |
| 575° F | Blistered | The paint film began to darken. |
| 615° F | The paint film cracked and blistered. | The film began to sinter. |
| 662° F | Charred | Hard vitreous film. |

The furnace temperature was ultimately raised to 815° F. After three and one-half hours of heating, the panels were quickly removed and chilled in a stream of cold water. The buff colored residual pigment on panel A was easily washed off. The pigment on panel B was not removed by water or scrubbing but remained a tightly adhering flat film of pleasing slate color. Repeated quick heating and chilling the panel B in rapid succession had no effect on the film. The paint film on panel B was smooth.

Another panel identical to panel B was exposed to a uniform high temperature and then suddenly chilled. The same results were observed. The film withstood great changes successfully.

*Example 2*

This paint had the following composition:

Vehicle 30%:
  Linseed oil
Pigment 70%:
  Red lead 25.8 grams of boric acid per 100 grams of paint was added to the above composition, this being a sufficient amount to convert 26 per cent of the red lead into lead tetraborate.

When a metal panel coated with the above paint diluted with 25 per cent linseed oil to which no boric acid had been added was gradually heated to 700° F. for three hours, the paint film disintegrated rapidly. However, a metal panel coated with the same paint which had been diluted with 25 per cent by volume of linseed oil and to which had been added 25.8 per cent by weight of boric acid withstood the same test very well. The pigment adhered very tightly to the metal surfaces although the film was rather spongy.

*Example 3*

To combine the favorable results observed in Examples 1 and 2, namely, a smooth surface and an extremely tight adhesion a third paint having the following composition was prepared:

| Pigment 44% by weight: | Parts by weight |
|---|---|
| Blue lead | 34 |
| Litharge | 12 |
| Red iron oxide | 27 |
| Boric acid | 27 |
| Vehicle 56% by weight: | Per cent |
| Linseed oil | 100 |

A sufficient amount of boric acid was added to convert three-fourths of the lead oxide in the blue lead and the litharge pigments to tetraborates and the ingredients passed through a paint mill. The uncombined lead oxide and the red iron oxide fills empty spaces caused by shrinkage of the film during heating and prevents the spongy appearance that characterized the paint of Example 2.

A panel coated with this paint composition was gradually heated to 1100° F. over a period of 72 hours and then plunged into cold water. The adhesion of the film to the surface remained excellent and the surface had a red color. If a black coating is desired, I substitute manganese dioxide for the red iron oxide in Example 3.

It may thus be seen that I have succeeded in overcoming the defects of heat-resisting paints characterized by the presence of pre-melted heavy metal borates. My paint compositions have excellent storage stability. They brush out easily, do not harm spraying equipment, and resist weathering and high temperatures.

Having thus described my invention, I claim:

1. A paint composition for metal surfaces subjected to high temperatures comprising a drying oil vehicle and an inorganic component which reacts upon fusion to form a vitreous film, said inorganic component consisting of blue lead which constitutes about 44% by weight of the composition and boric acid as the sole reactants to form a fusible mixture, the boric acid being present in sufficient amount to convert at least 75% of the lead oxide in the blue lead to lead tetraborate, said paint composition having the properties of forming a dried film on the metal surface to which it is applied, said film remaining until said surface or a part thereof is heated to such degree as to destroy the organic vehicle, and whereupon the constituents of said inorganic component react to provide a solid imperforate vitreous film of lead borate.

2. A paint composition for metal surfaces subjected to high temperatures comprising a drying oil vehicle and an inorganic component which reacts upon fusion to form a vitreous film, said inorganic component consisting of red lead which constitutes approximately 70% by weight of the composition and boric acid as the sole reactants to form a fusible mixture, the boric acid being present in sufficient amount to convert at least 26% of the red lead into lead tetraborate, said paint composition having the properties of forming a dried film on the metal surface to which it is applied, said film remaining until said surface or a part thereof is heated to such degree as to destroy the organic vehicle, and whereupon the constituents of said inorganic component react to provide a solid imperforate vitreous film of lead borate.

PAUL ZURCHER.